(12) United States Patent
Ding et al.

(10) Patent No.: US 10,216,341 B2
(45) Date of Patent: Feb. 26, 2019

(54) TOUCH DISPLAY PANEL, DRIVING METHOD FOR THE SAME AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Haisheng Wang, Beijing (CN); Yingming Liu, Beijing (CN); Weijie Zhao, Beijing (CN); Shengji Yang, Beijing (CN); Wei Liu, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 37 days.

(21) Appl. No.: 15/104,523

(22) PCT Filed: Oct. 23, 2015

(86) PCT No.: PCT/CN2015/092671
§ 371 (c)(1),
(2) Date: Jun. 14, 2016

(87) PCT Pub. No.: WO2016/176971
PCT Pub. Date: Nov. 10, 2016

(65) Prior Publication Data
US 2017/0115769 A1    Apr. 27, 2017

(30) Foreign Application Priority Data
May 5, 2015   (CN) .......................... 2015 1 0223671

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04103* (2013.01); *G06F 2203/04107* (2013.01)

(58) Field of Classification Search
CPC ........... G06F 3/044; G06F 2203/04103; G06F 2203/04107
(Continued)

(56) References Cited

U.S. PATENT DOCUMENTS

| | | | | |
|---|---|---|---|---|
| 2010/0045632 A1* | 2/2010 | Yilmaz | ................ | G01D 5/2405 345/174 |
| 2011/0057900 A1* | 3/2011 | Huang | .................... | G06F 3/044 345/174 |

(Continued)

FOREIGN PATENT DOCUMENTS

| CN | 103049155 A | 4/2013 |
|---|---|---|
| CN | 103631432 A | 3/2014 |

(Continued)

OTHER PUBLICATIONS

First Chinese Office Action, for Chinese Patent Application No. 201510223671.9, dated Apr. 5, 2017, 14 pages.
(Continued)

*Primary Examiner* — Mark Regn
(74) *Attorney, Agent, or Firm* — Kinney & Lange, P.A.

(57) ABSTRACT

The disclosure provides a touch display panel, a driving method and a touch display device. The panel includes: a plurality of first electrode groups arranged in a first direction and a plurality of second electrode groups arranged in a second direction, wherein each first electrode group includes
(Continued)

a plurality of first electrodes arranged in the second direction, and each second electrode group includes a plurality of second electrode subgroups disposed adjacent to each other and arranged in the second direction, each of the second electrode subgroups including a plurality of second electrodes arranged in the first direction; and wherein the first and second electrodes are disposed in different layers respectively, and projections of the second electrodes on the layer in which the first electrodes are disposed do not overlap with the first electrodes and are alternately arranged with the first electrodes in both the first and second directions.

20 Claims, 6 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2013/0106778 A1 | 5/2013 | Lin et al. | |
| 2013/0112541 A1 | 5/2013 | Wang et al. | |
| 2013/0112542 A1* | 5/2013 | Wang | G06F 3/0412 200/600 |
| 2014/0168154 A1* | 6/2014 | Wang | G06F 3/0412 345/174 |
| 2014/0375590 A1* | 12/2014 | Cok | G06F 3/044 345/174 |

FOREIGN PATENT DOCUMENTS

| | | |
|---|---|---|
| CN | 103838431 A | 6/2014 |
| CN | 103995633 A | 8/2014 |
| CN | 104090678 A | 10/2014 |
| CN | 104123039 A | 10/2014 |
| CN | 203950288 U | 11/2014 |
| CN | 104391600 A | 3/2015 |
| CN | 104393021 A | 3/2015 |
| CN | 104765506 A | 7/2015 |
| CN | 103412675 B | 7/2016 |
| CN | 103257770 B | 9/2016 |
| KR | 20120100488 A | 9/2012 |

OTHER PUBLICATIONS

International Search Report and Written Opinion from PCT Application Serial No. PCT/CN2015/092671, dated Feb. 4, 2016, 11 pages.
Second Chinese Office Action, for Chinese Patent Application No. 201510223671.9, dated Nov. 1, 2017, 14 pages.
First Korean Office Action dated May 31, 2018, received for corresponding Korean Application No. 10-2016-7029744.
Extended European Search Report dated Dec. 5, 2018, received for corresponding European Application No. 15866396.3.

* cited by examiner

TOUCH DISPLAY PANEL, DRIVING METHOD FOR THE SAME AND TOUCH DISPLAY DEVICE

CROSS-REFERENCE TO RELATED APPLICATIONS

This application is a National Stage application of International Application No. PCT/CN2015/092671, filed on Oct. 23, 2015, entitled "Touch Display Panel, Driving Method thereof and Touch Display Device", which claims priority to Chinese Application No. 201510223671.9, filed on May 5, 2015 and entitled "Touch Display Panel, Driving Method for the Same and Touch Display Device", and the above applications are incorporated herein by reference in their entirety.

TECHNICAL FIELD

The present disclosure relates to a field of display technology, and particularly to a touch display panel, a driving method for the same and a touch display device.

BACKGROUND

In-cell Touch technology is a technology in which touch elements are integrated in interior of a display screen so that the display screen itself has a touch function. In-cell Touch display device has the following advantages: the manufacture of the touch elements can be completed in the standard manufacturing process of the touch display device, there is no problem of fitting and aligning in position, the products are lighter and thinner, there is no requirements for a edge frame and a complete planar design is achieved. Accordingly, In-cell Touch display device is one of the hot points that are being studied in the art. In the existing In-cell touch display devices, the In-cell touch function are usually achieved in a manner of time division multiplexing of a common electrode layer on an array substrate.

SUMMARY

The present disclosure provides a touch display panel, including: a plurality of first electrode groups arranged in a first direction and a plurality of second electrode groups arranged in a second direction, wherein each of the first electrode groups includes a plurality of first electrodes arranged in the second direction, and each of the second electrode groups includes a plurality of second electrode subgroups disposed adjacent to each other and arranged in the second direction, each of the second electrode subgroups including a plurality of second electrodes arranged in the first direction;

wherein the first electrodes and the second electrodes are disposed in different layers respectively, and projections of the second electrodes on the layer in which the first electrodes are disposed do not overlap with the first electrodes and are alternately arranged with the first electrodes in both the first direction and the second direction;

wherein a first lead connected to a peripheral region of the touch display panel is disposed on each of the first electrodes, all the first leads corresponding to the respective first electrodes in a same first electrode group are electrically connected to each other in the peripheral region; and wherein all the second electrodes in a same second electrode group are electrically connected to each other.

The present disclosure also provides a touch display device including a touch display panel that is the touch display panel described above.

The present disclosure also provides a driving method for a touch display panel, wherein the touch display panel is a touch display panel described above, and the second electrodes are connected to the peripheral region through second leads, wherein when the first electrodes are touch scanning electrodes and the second electrodes are touch sensing electrodes, the driving method for the touch display panel including:

in a touch phase, outputting a touch scanning signal to the first electrodes and detecting a touch sensing signal on the second electrodes; and wherein when the first electrodes are touch sensing electrodes and the second electrodes are touch scanning electrodes, the driving method for the touch display panel including:

in a touch phase, outputting a touch scanning signal to the second electrodes and detecting a touch sensing signal on the first electrodes.

The present disclosure also provides a driving method for a touch display panel, wherein the touch display panel includes a plurality of first electrode groups arranged in a first direction and a plurality of second electrode groups arranged in a second direction, wherein each of the first electrode groups includes a plurality of first electrodes arranged in the second direction, and each of the second electrode groups includes a plurality of second electrode subgroups disposed adjacent to each other and arranged in the second direction, each of the second electrode subgroups including a plurality of second electrodes arranged in the first direction;

wherein the first electrodes and the second electrodes are disposed in different layers respectively, and projections of the second electrodes on the layer in which the first electrodes are disposed do not overlap with the first electrodes and are alternately arranged with the first electrodes in both the first direction and the second direction;

wherein a first lead connected to a peripheral region of the touch display panel is disposed on each of the first electrodes, all the first leads corresponding to the respective first electrodes in a same first electrode group are electrically connected to each other in the peripheral region;

wherein all the second electrodes in a same second electrode group are electrically connected to each other;

wherein the touch display panel includes an array substrate and an assembling substrate disposed opposite to the array substrate, wherein the first electrodes are disposed on the array substrate and the second electrodes are disposed on the assembling substrate.

wherein the array substrate includes a first base substrate and a plurality of common electrodes disposed on the first base substrate;

wherein the first electrodes and the common electrodes are provided in a same layer; and the first electrodes and the common electrodes are alternately disposed in both the first direction and the second direction and the second electrodes are connected to the peripheral region through second leads.

wherein when the first electrodes are touch scanning electrodes and the second electrodes are touch sensing electrodes, the driving method for the touch display panel including:

in a touch phase, outputting a touch scanning signal to the first electrodes and detecting a touch sensing signal on the second electrodes; and in a display phase, outputting a common voltage signal to the first electrodes and the common electrodes;

wherein when the first electrodes are touch sensing electrodes and the second electrodes are touch scanning electrodes, the driving method for the touch display panel including:

in a touch phase, outputting a touch scanning signal to the second electrodes and detecting a touch sensing signal on the first electrodes; and in a display phase, outputting a common voltage signal to the first electrodes and the common electrodes.

DETAILED DESCRIPTION OF EMBODIMENTS

Figure 1:
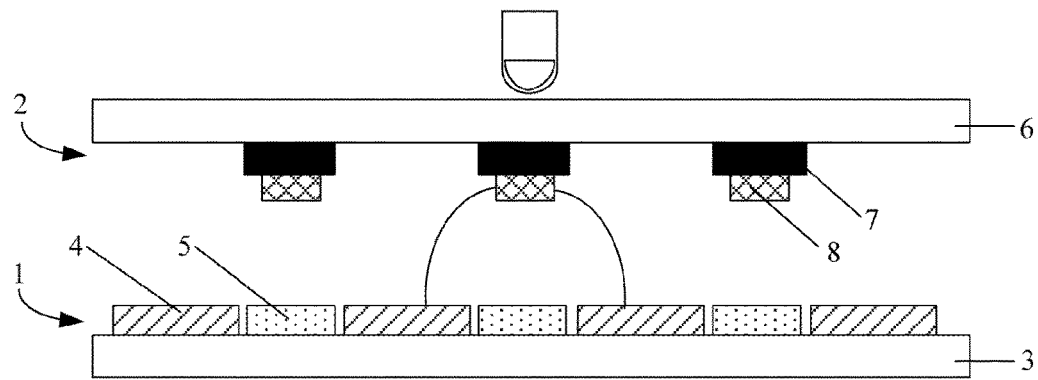
FIG. 1 is a schematic cross-sectional view of In-cell touch display panel.
Figure 2:
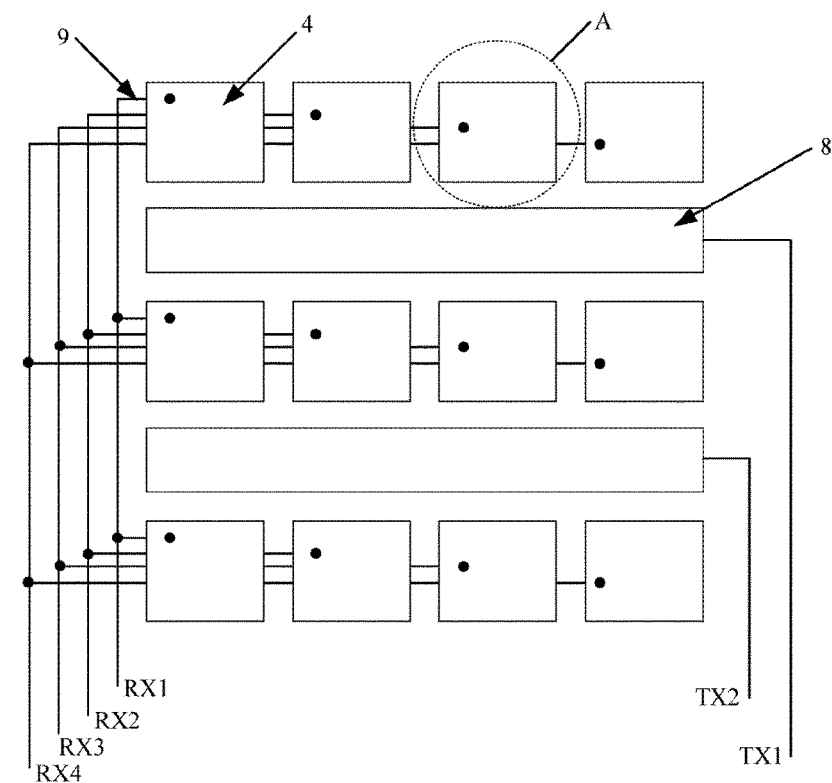
FIG. 2 is a top view of touch scanning electrodes and touch sensing electrodes in the touch display panel shown in FIG. 1.

FIG. 1 is schematic sectional view showing an In-cell touch display panel in the prior art. FIG. 2 is a top view of touch scanning electrodes and touch sensing electrodes in the touch display panel shown in FIG. 1. As shown in FIGS. 1 and 2, the touch display panel includes: an array substrate 1 and a color filter substrate 2 that are provided opposite to each other, wherein the array substrate 1 includes a first base substrate 3 and a common electrode layer disposed on the first base substrate, where the common electrode layer is divided into a number of blocked touch sensing electrodes 4 and a number of stripped common electrodes 5 extending in a row direction, and wherein the touch sensing electrodes 4 and the stripped common electrodes 5 are alternately disposed in a column direction. In FIG. 2, each of the touch sensing electrodes 4 is connected to a peripheral region of the array substrate by a lateral lead 9 (lateral leads 9 correspond to the touch sensing electrodes one by one and lateral leads 9 are connected to the touch sensing electrodes through vias (not shown)), and all the lateral leads 9 corresponding to all the touch sensing electrodes 4 in the same column are electrically connected to receive touch sensing signals RX (only RX1, RX2, RX3, RX4 are exemplarily shown in Figures). The color filter substrate 2 includes a second base substrate 6 and black matrixes 7 disposed on the second base substrate 6, wherein the black matrixes 7 define pixel regions and light-shielding regions. Stripped touch scanning electrodes 8 are disposed in the light-shielding regions. The touch scanning electrodes 8 are disposed opposite to the stripped common electrodes 5.

When a touch is performed, whether there is a finger touch is determined by outputting touch scanning signals TX to the touch scanning electrode 8 on the color filter substrate 2 line by line (only TX1, TX2 are exemplarily shown in Figures), then receiving the touch sensing signal RX on the corresponding touch sensing electrode 4 through the lateral leads 9, calculating an amount of change of the capacitance between the touch scanning electrode 8 and the touch sensing electrodes 4 before and after the finger touch, and comparing the amount of change of the capacitance with a preset threshold value, thereby achieving touch identification.

However, there are two interferences when touch identification is performed by the conventional touch display panel. On one hand, since a contact area of a human finger is large, the edge of the finger usually comes into contact with other touch sensing electrodes adjacent to the current touch sensing electrode, so that touch interference occurs at the edge of the finger. On the other hand, since the lateral leads connecting the touch sensing electrodes (except for those in the first column) will pass through other touch sensing electrodes, the lateral lead carrying touch sensing signal will result in a certain degree of crosstalk to the touch sensing electrodes through which it passes.

A region A shown in FIG. 2 that is touched by the finger is taken as an example, that is, a location at which the touch sensing electrode 4 in the first row and in the third column is disposed is touched. At this time, a location at which the touch sensing electrode 4 in the first row and in the second column is disposed will be touched by the edge of the finger touch, so that touch interference occurs at the edge of the finger. At the same time, since the lateral lead connecting the touch sensing electrode 4 in the first row and in the third column passes through the touch sensing electrode 4 in the first row and in the second column, when the lateral lead carries touch sensing signal RX3, a certain degree of crosstalk to the touch sensing signal RX2 in the touch sensing electrode 4 in the first row and in the second column will occur. Since the two above interferences simultaneously occur in the touch sensing electrode in the first row and in the second column, the amount of interferences on the touch sensing electrode 4 is large, such that the amount of change of the capacitance corresponding to the touch sensing electrode 4 in the first row and in the second column is large and such that the region corresponding to the touch sensing electrode 4 in the first row and in the second column is incorrectly identified as a touch region.

It can be seen from the above that, when a touch identification is performed by a touch display panel in the prior art, the interference caused by the finger edge touch and the interference caused by the crosstalk from the lateral lead will act on the touch sensing electrodes disposed near the actual touch region, such that the amount of interference to the touch sensing electrodes disposed near the actual touch region is large and such that the region disposed near the actual touch region is incorrectly identified as a touch region, resulting in a poor touch identification accuracy of the touch display panel.

To enable those skilled in the art to better understand the technical solution of the present disclosure, a touch display panel, a driving method for the same and a touch display device are described below in detail with reference to the accompanying drawings.

The present disclosure provides a touch display panel, a driving method for the same and a touch display device, which can effectively avoid the region near the actual touch region from being incorrectly identified as a touch region, thereby being able to effectively improve the accuracy of the touch display panel.

Figure 3:
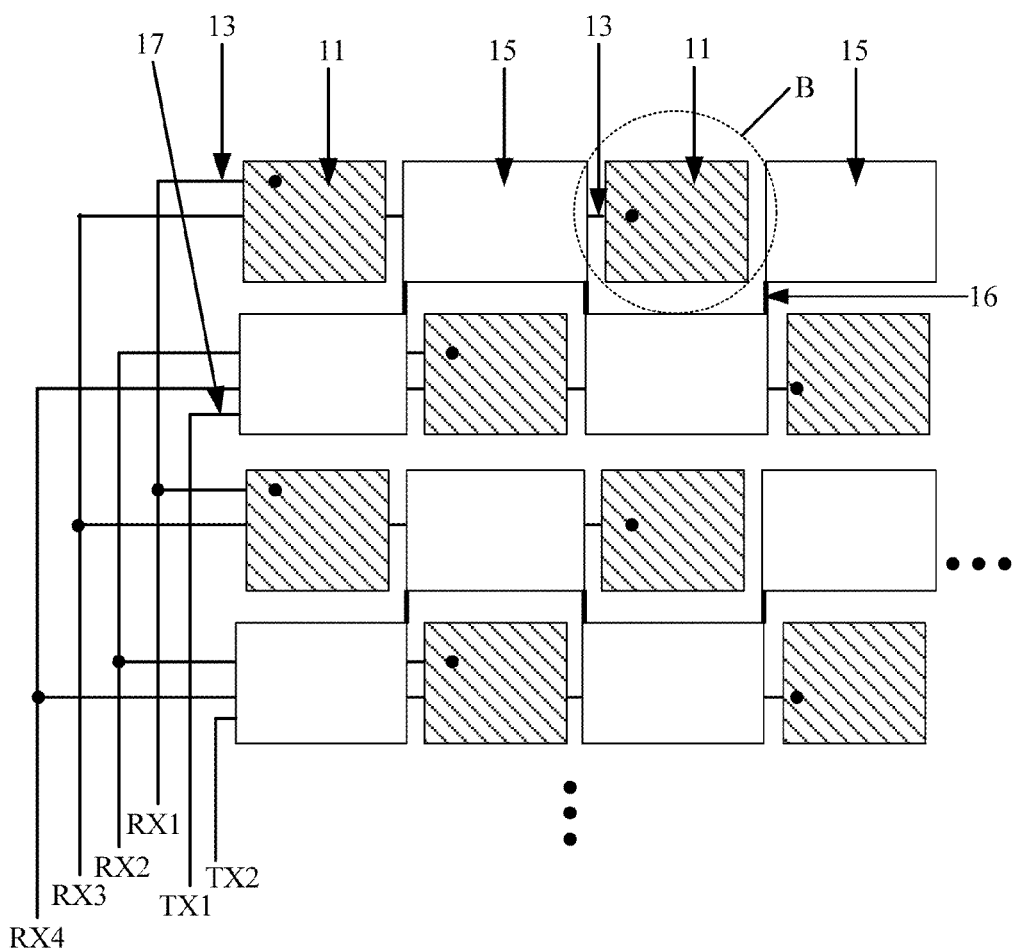
FIG. 3 is a top view of a touch display panel provided in at least one embodiment of the present invention.
Figure 4:
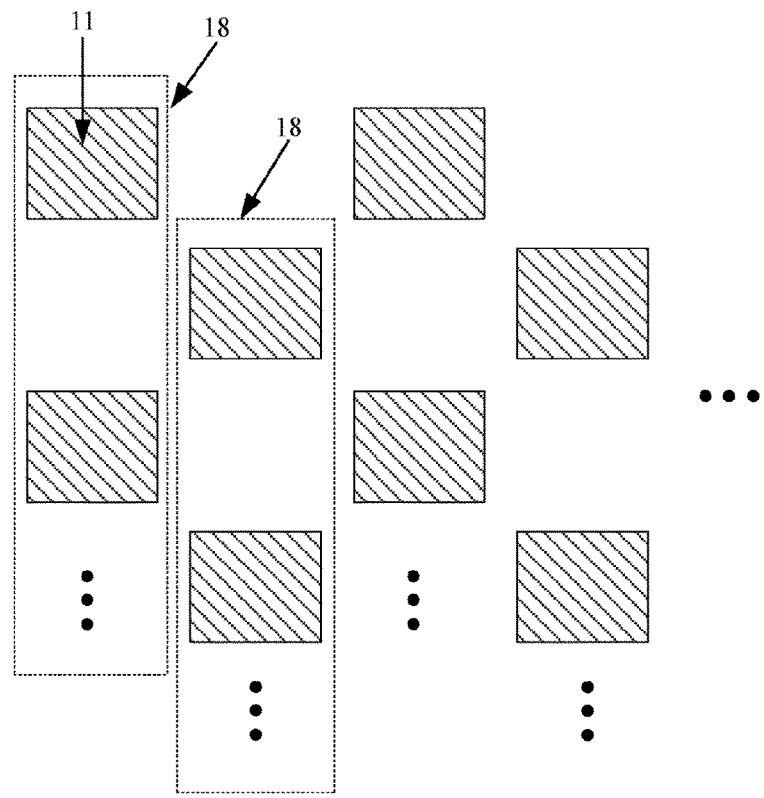
FIG. 4 is a schematic distribution view of first electrodes in FIG. 3.
Figure 5:
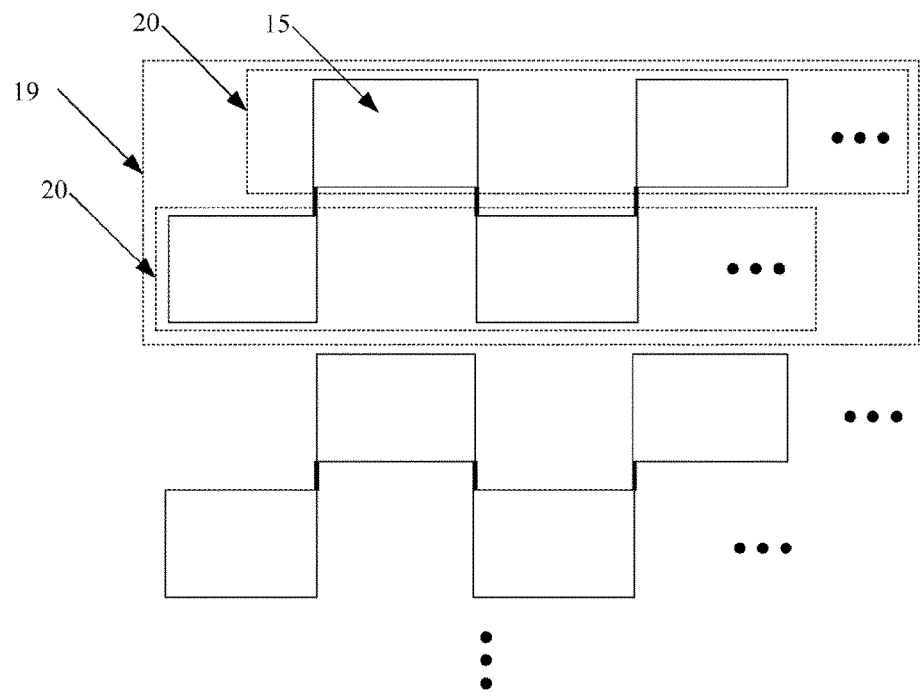
FIG. 5 is a schematic distribution view of second electrodes in FIG. 3.

FIG. 3 is a top view of a touch display panel provided in at least one embodiment of the present invention; FIG. 4 is a schematic distribution view of first electrodes in FIG. 3; and FIG. 5 is a schematic distribution view of second electrodes in FIG. 3. As shown in FIGS. 3-5, the touch display panel includes a plurality of first electrode groups 18 and a plurality of second electrode groups 19, wherein all of the first electrode groups 18 are arranged in a first direction and all of the second electrode groups 19 are arrange in a second direction; wherein each of the first electrode groups 18 includes a plurality of first electrodes 11 arranged in the second direction, and each of the second electrode groups 19 includes a plurality of second electrode subgroups 20 disposed adjacent to each other and arranged in the second direction, each of the second electrode subgroups 20 including a plurality of second electrodes 15 arranged in the first direction.

The first electrodes 11 and the second electrodes 15 are disposed in different layers, and projections of the second electrodes 15 on the layer in which the first electrodes 11 are disposed do not overlap with the first electrodes 11 and are alternately arranged with the first electrodes 11 in both the first direction and the second direction. A first lead 13 connected to a peripheral region of the touch display panel is disposed on each of the first electrodes 11, all the first leads 13 corresponding to all the respective first electrodes 11 in the same first electrode group 18 are electrically connected to each other in the peripheral region; and all the second electrodes 15 in the same second electrode group 19 are electrically connected to each other.

In the present embodiment, one of the first electrode 11 and the second electrode 15 serves as a touch scanning electrode, and the other of the first electrode 11 and the second electrode 15 serves as a touch sensing electrode.

To enable those skilled in the art to better understand the technical solution of the present disclosure, an embodiment in which the first electrodes 11 serve as touch sensing electrodes, the second electrodes 15 serve as touch scanning electrodes, the first direction is a row direction, and the second direction is a column direction is taken as an example to be described. Then, each of the second electrode groups may generate a corresponding touch scanning signal TX (only TX1, TX2 are exemplarily shown in Figures), each of the first electrode groups can generate a corresponding touch sensing signal RX (only RX1, RX2, RX3, RX4 are exemplarily shown in Figures).

It should be noted by those skilled in the art that the above arrangement is only shown as an example, which will not limit the technical solution of the present application.

In the present embodiment, optionally, corresponding conductive strips 16 which are disposed in a same layer as the second electrodes 15 is provided such that all the second electrodes 15 in the same second electrode group 19 are electrically connected to each other. In this case, only one second lead 17 that is connected to the peripheral region of the touch display panel is required to be correspondingly provided for each of the second electrode groups 19, which can effectively reduce the number of peripheral leads of the touch display panel. Preferably, the second lead 17 is electrically connected to the second electrode 15 of the respective second electrode group 19 closest to the peripheral region of the touch display panel. Then, the wiring length of the second lead 17 can be effectively reduced.

It can be known to those skilled in the art that providing the conductive strip 16 will not be limited on the technical solution of the present application and that the electrical connection among all the second electrodes 15 in the same second electrode groups 19 can be achieved in other ways.

In the present embodiment, optionally, there are just two second electrode subgroups in the second electrode group, that is, every two adjacent rows of second electrodes may be simultaneously driven. In this case, the maximization of touch resolution of the touch display panel can be achieved while it is ensured that each region on the touch display panel can achieve touch identification.

Continuing to refer to FIG. 3, when a finger touches the touch display panel, although there is still a finger edge touch interference and a lead crosstalk interference (which occurs in the first electrodes through which the first lead passes when the first lead is transmitting the touch sensing signal) in the region near the actual touch region, any one of the first electrodes 11 near the actual touch region will not be subject to the two above interferences at the same time.

A region B in FIG. 3 will be taken as an example of the actual touch region that is touched by the finger to be described in the following, that is, the location where the first electrode 11 in the first row and in the third column is located is touched. Then, in particular, the first electrodes 11 near the region B include the first electrode 11 in the first row and in the first column, the first electrode 11 in the second row and in the second column, and the first electrode 11 in the second row and in the fourth column.

Since a location where the first electrode 11 in the second row and in the second column is located and a location where the first electrode 11 in the second row and in the fourth column is located may be touched by the finger edge, the first electrode 11 in the second row and in the second column and the first electrode 11 in the second row and in the fourth column will be subject to the touch interference caused by the finger edge. However, since the first lead corresponding to the first electrode 11 in the first row and in the third column does not pass through the region where the first electrode 11 in the second row and in the second column is located and the region where the first electrode 11 in the second row and in the fourth column is located, the first electrode 11 in the second row and in the second column and the first electrode 11 in the second row and in the fourth column will not be subject to the lead crosstalk interference. Therefore, the amount of interference which the first electrode 11 in the second row and in the second column and the first electrode 11 in the second row and in the fourth column will be subject to is small.

At the same time, since the first lead corresponding to the first electrode 11 in the first row and in the third column passes through the region where the first electrode 11 in the first row and in the first column is located, the first electrode 11 in the first row and in the first column is located will be subject to the lead crosstalk interference. However, since the first electrode 11 in the first row and in the first column is far away from the first electrode 11 in the first row and in the third column (the distance therebetween is larger than the width of one second electrode 12), the first electrode 11 in the first row and in the first column will not be subject to the touch interference caused by the finger edge. Therefore, the amount of interference which the first electrode 11 in the first row and in the first column will be subject to is small.

Based on the above example, it can be known by extension that, when the finger touches any location on the touch display panel illustrated in FIG. 3, since the first electrodes 11 near the actual touch region will not be subject to the touch interference caused by the finger edge and the crosstalk interference caused by the lead at the same time, that is, the interference which the first electrodes 11 near the actual touch region will be subject to is small, the regions near the actual touch region will not be incorrectly identified as the touch region. Therefore, the touch identification accuracy of the touch display panel provided in the present embodiment will be improved.

As a more specific solution in the present embodiment, the touch display panel includes an array substrate and an assembling substrate disposed opposite to the array substrate, wherein the first electrodes are disposed on the array substrate and the second electrodes are disposed on the assembling substrate.

Figure 6:
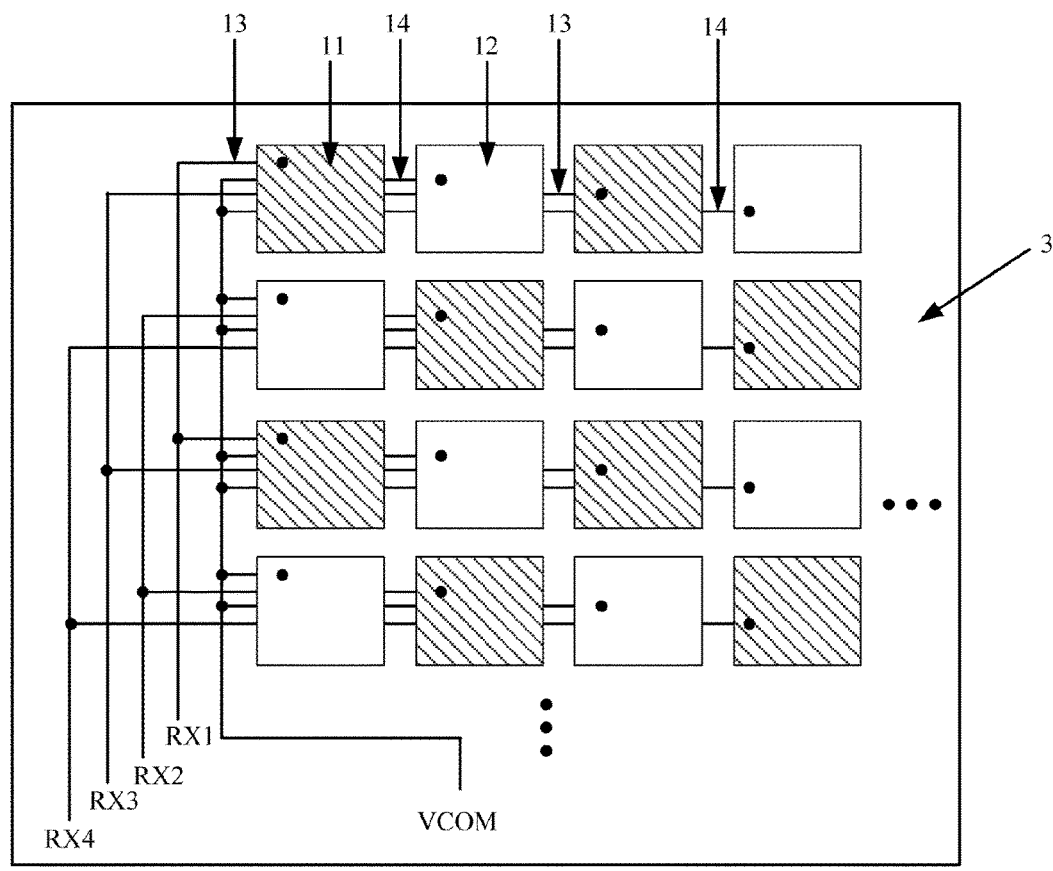
FIG. 6 is a top view of an array substrate in the at least one embodiment of the present invention.

FIG. 6 is a top view of the array substrate in the at least one embodiment of the present invention. As shown in FIG. 6, the array substrate further includes a first base substrate 3 and a plurality of common electrodes 12 disposed on the first base substrate 3; the first electrodes 11 and the common electrodes 12 are provided in a same layer; and the first electrodes 11 and the common electrodes 12 are alternately disposed in both the first direction and the second direction. The first electrodes 11 and the common electrodes 12 then can be simultaneously prepared in one patterning process.

It should be noted that the first electrodes 11 in the present solution may be used as touch electrodes in the touch phase and may be used as common electrodes in the display phase. The specific solution will be described in detail in the following.

It should be additionally noted that, in FIG. 6, a third lead 14 connected to the peripheral region of the touch display panel is disposed on each of the common electrodes 12, and all of the third leads 14 on the array substrate 14 are electrically connected to each other in the peripheral region of the array substrate in order to obtain an electrical connection to each other among all the common electrodes 12. The above case is only an example. It should be known to those skilled in the art that, the means in the present embodiment by which all the common electrodes 12 on the array substrate are electrically connected is not intended to be limited to that shown in FIG. 6, and other means can also be employed to obtain the electrical connection among all the common electrodes 12, which will not be illustratively described.

Further alternatively, the first electrodes and the common electrodes are the same in shape. Since the first electrodes 11 and the common electrodes 12 are the same in shape, the first electrodes 11 and the common electrodes 12 can be uniformly distributed in the array substrate, which can effectively improve the uniformity of display effect of the touch display panel.

Figure 7:
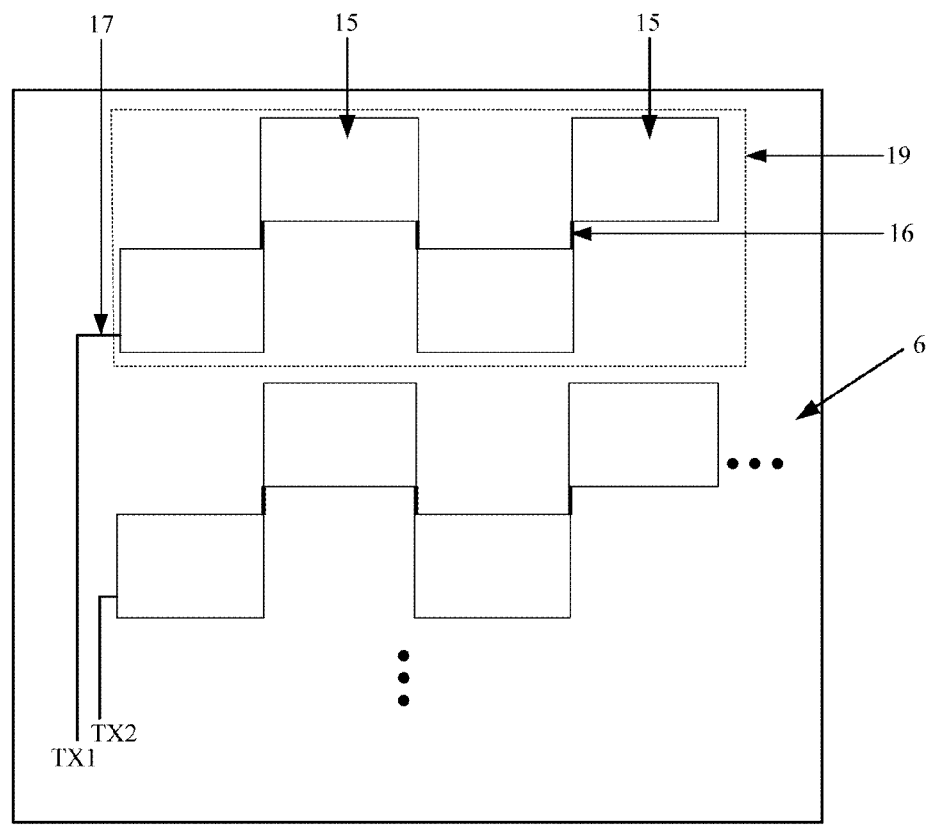
FIG. 7 is a top view of an assembling substrate in the at least one embodiment of the present invention.

FIG. 7 is a top view of the assembling substrate in the at least one embodiment of the present invention. As shown in FIG. 7, the assembling substrate includes a second base substrate 6 and a light-shielding layer (not shown) disposed on the second base substrate 6; the material of the second electrode 15 is a metallic material, and the second electrodes 15 are disposed above the light-shielding layer. In this embodiment, since the material of the second electrode 15 is a metallic material (such as Al, Mo, Cr, and so on), it is necessary to ensure that the light-shielding layer (not shown) in the assembling substrate does cover the second electrodes 15 completely. It should be noted that the second electrode 15 may be particularly of a metallic grid structure.

Further, in the present embodiment, the material of the second electrode 15 may also be a transparent conductive material (for example, ITO), and then it may be unnecessary for the second electrode 15 to be covered by a light shielding layer.

At least one embodiment of the present invention provides a touch display device including a touch display panel that is the touch display panel described in the at least one embodiment above. The specific description can be found in the contents described in the at least one embodiment, which will not be described in detail here.

At least one embodiment of the present invention provides a driving method for a touch display panel, wherein the touch display panel is the touch display panel described in the at least one embodiment above, the specific structure of which can be found in the contents described in the at least one embodiment.

Figure 8:
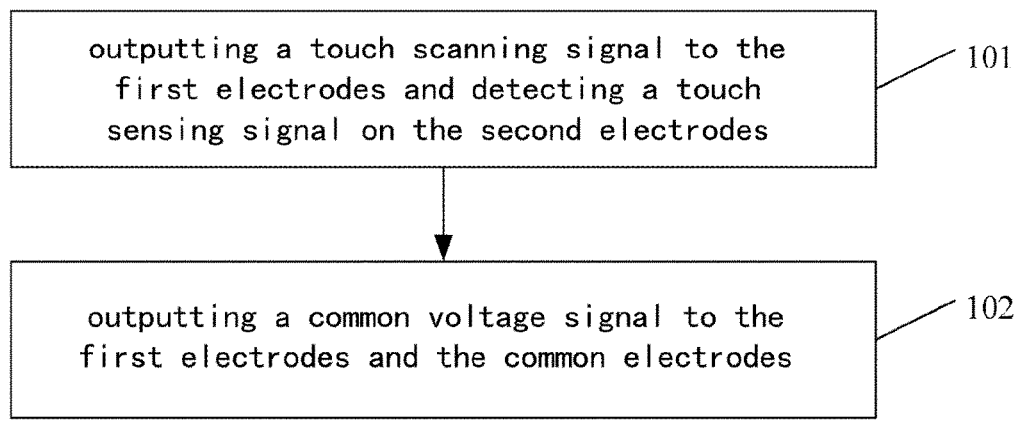
FIG. 8 is a flow chart of a driving method for a touch display panel provided in the at least one embodiment of the invention.

FIG. 8 is a flow chart of a driving method for a touch display panel provided in the at least one embodiment of the invention. As shown in FIG. 8, when the first electrodes in the touch display panel are touch scanning electrodes and the second electrodes are touch sensing electrodes, the driving method for the touch display panel includes:

a step 101 of outputting a touch scanning signal to the first electrodes and detecting a touch sensing signal on the second electrodes.

In particular, a touch scanning signal is firstly provided to the corresponding first electrode by the first lead and then a touch sensing signal on the second electrode is detected by the second lead.

As an example, the touch display panel includes an array substrate and an assembling substrate disposed opposite to the array substrate, the first electrodes are disposed on the array substrate and the second electrodes are disposed on the assembling substrate. The array substrate includes a first base substrate and a plurality of common electrodes disposed on the first base substrate; the first electrodes and the common electrodes are provided in a same layer; and the first electrodes and the common electrodes are alternately disposed in both the first direction and the second direction.

When the first electrodes are disposed in a same layer as the common electrodes on the array substrate and are used as common electrodes in the display phase, the driving method further includes:

a step 102 of outputting a common voltage signal to the first electrodes and the common electrodes.

It should be noted that, the step 102 in this embodiment may be performed prior to the step 101. In an actual operating state of the display panel, the touch display panel operates in an operating period of the above-described step 101 and step 102 and repeatedly operates, obtaining a continuous display and touch identification. The principle of the touch display panel based on the driving method described above to achieve the pixel display and the touch identification will not be repeated here.

Figure 9:
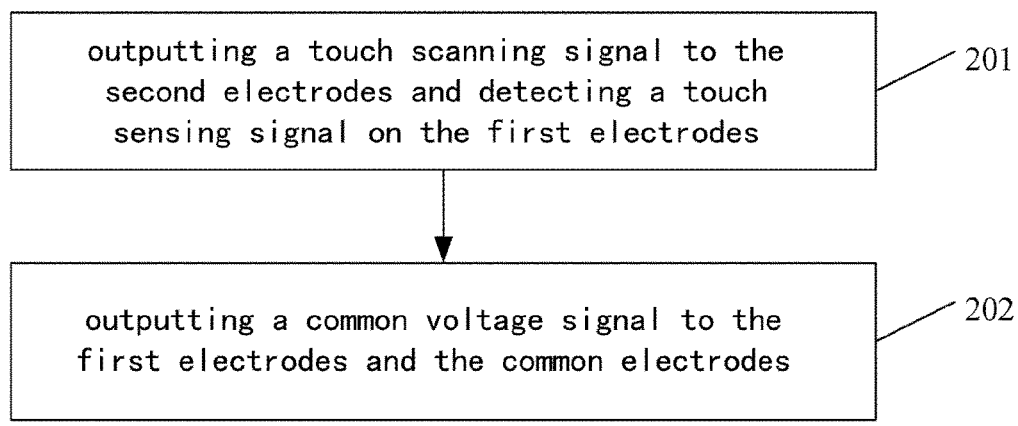
FIG. 9 is a flowchart of another driving method for a touch display panel provided in the at least one embodiment of the invention.

FIG. 9 is a flowchart of another driving method for a touch display panel provided in the at least one embodiment of the invention. As shown in FIG. 9, when the first electrodes in the touch display panel are touch sensing electrodes and the second electrodes are touch scanning electrodes, the driving method for the touch display panel includes:

a step 201 of outputting a touch scanning signal to the second electrodes and detecting a touch sensing signal on the first electrodes.

In particular, a touch scanning signal is firstly provided to the corresponding second electrode by the second lead and then a touch sensing signal on the first electrode is detected by the first lead.

As an example, The touch display panel includes an array substrate and an assembling substrate disposed opposite to the array substrate, the first electrodes are disposed on the array substrate and the second electrodes are disposed on the assembling substrate. The array substrate includes a first base substrate and a plurality of common electrodes disposed on the first base substrate; the first electrodes and the common electrodes are provided in a same layer; and the first electrodes and the common electrodes are alternately disposed in both the first direction and the second direction.

When the first electrodes are disposed in a same layer as the common electrodes on the array substrate and are used as common electrodes in the display phase, the driving method further includes:

a step 202 of outputting a common voltage signal to the first electrodes and the common electrodes.

It should be noted that, the step 202 in this embodiment may be performed prior to the step 201. In an actual operating state of the display panel, the touch display panel operates in an operating period of the above-described step 201 and step 202 and repeatedly operates, obtaining a continuous display and touch identification.

The present disclosure has the following beneficial effects:

The present disclosure provides a touch display panel, a driving method for the same and a touch display device, wherein the touch display panel includes: a plurality of first electrode groups arranged in a first direction and a plurality of second electrode groups arranged in a second direction, wherein each of the first electrode groups includes a plurality of first electrodes arranged in the second direction, and each of the second electrode groups includes a plurality of second electrode subgroups disposed adjacent to each other and arranged in the second direction, each of the second electrode subgroups including a plurality of second electrodes arranged in the first direction; and wherein the first electrode and the second electrode are disposed in different layers, and projections of the second electrodes on the layer in which the first electrodes are disposed do not overlap with the first electrodes and are alternately arranged with the first electrodes in both the first direction and the second direction. The solutions in the disclosure make it possible that, when a touch is performed, the first electrodes disposed near the actual touch region are not subject to the interference caused by the finger edge touch and the interference caused by the crosstalk from the leads, that is, the interference that the first electrodes disposed near the actual touch region is subject to is small. Therefore, the region located near the actual touch region is incorrectly identified as a touch region, and touch identification accuracy of the touch display panel according to the disclosure is improved.

It should be appreciated that the above embodiments are merely exemplary embodiments that are used to illustrate the principles of the present disclosure. However, the present disclosure is not limited thereto. Various modifications and improvements that can also be considered to fall within the scope of the present disclosure can be made by those with ordinary skill in the art without departing from the spirit and essential contents of the present disclosure.

What is claimed is:

1. A touch display panel, comprising: a plurality of first electrode groups arranged in a first direction and a plurality of second electrode groups arranged in a second direction, wherein each of the first electrode groups comprises a plurality of first electrodes, each of the plurality of first electrodes in each of the first electrode groups is arranged in the second direction with respect to each of the other electrodes in the same first electrode group, and each of the second electrode groups comprises a plurality of second electrode subgroups disposed adjacent to each other and arranged in the second direction, each of the second electrode subgroups comprising a plurality of second electrodes arranged in the first direction;

wherein the first electrodes and the second electrodes are disposed in different layers respectively, and projections of the second electrodes on the layer in which the first electrodes are disposed do not overlap with the first electrodes and are alternately arranged with the first electrodes in both the first direction and the second direction;

wherein the first electrodes are each directly and electrically connected to a respective first lead of a plurality of first leads extending to a peripheral region of the touch display panel, the first leads connected to the different first electrodes are different from each other, and all the first leads corresponding to the respective first electrodes in the same first electrode group are electrically connected to each other in the peripheral region; and wherein all the second electrodes in a same second electrode group are electrically connected to each other.

2. The touch display panel according to claim 1, wherein the second electrode in each second electrode group closest to the peripheral region of the touch display panel is electrically connected to a second lead extending to the peripheral region of the touch display panel.

3. The touch display panel according to claim 2, wherein the touch display panel comprises an array substrate and an assembling substrate disposed opposite to the array substrate, and wherein the first electrodes are disposed on the array substrate and the second electrodes are disposed on the assembling substrate.

4. The touch display panel according to claim 3, wherein the array substrate comprises a first base substrate and a plurality of common electrodes disposed on the first base substrate; and wherein the first electrodes and the common electrodes are provided in a same layer and the first electrodes and the common electrodes are alternately disposed in both the first direction and the second direction.

5. The touch display panel according to claim 4, wherein the first electrodes and the common electrodes are same in shape.

6. The touch display panel according to claim 3, wherein the assembling substrate comprises a second base substrate and a light-shielding layer disposed on the second base substrate; and wherein the material of the second electrodes is a metallic material, and the second electrodes are disposed above the light-shielding layer.

7. The touch display panel according to claim 3, wherein the material of the second electrodes is a transparent conductive material.

8. The touch display panel according to claim 1, wherein there are just two second electrode subgroups in each of the second electrode groups.

9. The touch display panel according to claim 8, wherein the touch display panel comprises an array substrate and an assembling substrate disposed opposite to the array substrate, and wherein the first electrodes are disposed on the array substrate and the second electrodes are disposed on the assembling substrate.

10. The touch display panel according to claim 9,
    wherein the array substrate comprises a first base substrate and a plurality of common electrodes disposed on the first base substrate; and
    wherein the first electrodes and the common electrodes are provided in a same layer and the first electrodes and the common electrodes are alternately disposed in both the first direction and the second direction.

11. The touch display panel according to claim 10, wherein the first electrodes and the common electrodes are same in shape.

12. The touch display panel according to claim 9,
    wherein the assembling substrate comprises a second base substrate and a light-shielding layer disposed on the second base substrate; and
    wherein the material of the second electrodes is a metallic material, and the second electrodes are disposed above the light-shielding layer.

13. The touch display panel according to claim 1, wherein the touch display panel comprises an array substrate and an assembling substrate disposed opposite to the array substrate, and wherein the first electrodes are disposed on the array substrate and the second electrodes are disposed on the assembling substrate.

14. The touch display panel according to claim 13,
    wherein the array substrate comprises a first base substrate and a plurality of common electrodes disposed on the first base substrate; and
    wherein the first electrodes and the common electrodes are provided in a same layer and the first electrodes and the common electrodes are alternately disposed in both the first direction and the second direction.

15. The touch display panel according to claim 14, wherein the first electrodes and the common electrodes are same in shape.

16. A driving method for a touch display panel, wherein the touch display panel is the touch display panel according to claim 14 and the second electrodes are connected to the peripheral region through second leads, wherein:
    the first electrodes are touch scanning electrodes and the second electrodes are touch sensing electrodes, and the driving method for the touch display panel comprises:
        in a touch phase, outputting a touch scanning signal to the first electrodes and detecting a touch sensing signal on the second electrodes; and
        in a display phase, outputting a common voltage signal to the first electrodes and the common electrodes;
    or
    the first electrodes are touch sensing electrodes and the second electrodes are touch scanning electrodes, and the driving method for the touch display panel comprises:
        in a touch phase, outputting a touch scanning signal to the second electrodes and detecting a touch sensing signal on the first electrodes; and
        in a display phase, outputting a common voltage signal to the first electrodes and the common electrodes.

17. The touch display panel according to claim 13,
    wherein the assembling substrate comprises a second base substrate and a light-shielding layer disposed on the second base substrate; and
    wherein the material of the second electrodes is a metallic material, and the second electrodes are disposed above the light-shielding layer.

18. The touch display panel according to claim 13, wherein the material of the second electrodes is a transparent conductive material.

19. A touch display device, comprising a touch display panel according to claim 1.

20. A driving method for a touch display panel, wherein the touch display panel is the touch display panel according to claim 1 and the second electrodes are connected to the peripheral region through second leads, wherein when the first electrodes are touch scanning electrodes and the second electrodes are touch sensing electrodes, the driving method for the touch display panel comprising:
    in a touch phase, outputting a touch scanning signal to the first electrodes and detecting a touch sensing signal on the second electrodes; and
    wherein when the first electrodes are touch sensing electrodes and the second electrodes are touch scanning electrodes, the driving method for the touch display panel comprising:
    in a touch phase, outputting a touch scanning signal to the second electrodes and detecting a touch sensing signal on the first electrodes.

* * * * *